(12) United States Patent
Mitidieri et al.

(10) Patent No.: US 10,723,218 B2
(45) Date of Patent: Jul. 28, 2020

(54) AIR INLET MANAGEMENT SYSTEM FOR THE FRONT PANEL OF A MOTOR VEHICLE AND STRUCTURE OF SUCH A SYSTEM

(71) Applicant: Valeo Systemes Thermiques, Le Mesnil Saint Denis (FR)

(72) Inventors: Enzo Mitidieri, Le Mesnil Saint-Denis (FR); Frédéric Vacca, Le Mesnil Saint-Denis (FR); Thomas Nore, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 16/313,647

(22) PCT Filed: May 24, 2017

(86) PCT No.: PCT/FR2017/051310
§ 371 (c)(1),
(2) Date: Dec. 27, 2018

(87) PCT Pub. No.: WO2018/002461
PCT Pub. Date: Jan. 4, 2018

(65) Prior Publication Data
US 2019/0315224 A1    Oct. 17, 2019

(30) Foreign Application Priority Data
Jun. 28, 2016   (FR) ...................................... 16 56045

(51) Int. Cl.
*B60K 11/06* (2006.01)
*B60K 11/08* (2006.01)

(52) U.S. Cl.
CPC ............ *B60K 11/085* (2013.01); *B60K 11/06* (2013.01)

(58) Field of Classification Search
CPC .............................. B60K 11/06; B60K 11/085
See application file for complete search history.

(56) References Cited

U.S. PATENT DOCUMENTS 8,181,727 B2* 5/2012 Ritz .................... B60K 11/085
 180/68.1
2002/0153182 A1* 10/2002 Vaillancourt ........ B60K 11/085
 180/68.1

FOREIGN PATENT DOCUMENTS

DE     4123271 C1   6/1992
DE   102011056663 A1   6/2013
(Continued)

OTHER PUBLICATIONS

International Search Report and Written Opinion Issued in Corresponding PCT Application No. PCT/FR2017/051310, dated Sep. 8, 2017 (12 Pages with English Translation of International Search Report).

*Primary Examiner* — Bryan A Evans
(74) *Attorney, Agent, or Firm* — Osha Liang LLP

(57) ABSTRACT

The invention concerns a structure (2) of a system (1) for managing the air of an air inlet for the front panel of a motor vehicle, said structure (2) comprising:—a frame (3) intended to be positioned facing a heat exchanger (Ra), —one or more deflectors (7) that are secured to said frame (3) and are arranged in such a way as to intercept a flow of air and deflect it through said frame (3). The invention also concerns a system (1) for managing the air of an air inlet for the front panel of a motor vehicle having such a structure (2).

10 Claims, 2 Drawing Sheets

(56) References Cited

FOREIGN PATENT DOCUMENTS

| JP | S6066586 U | 5/1985 |
| JP | S60169625 A | 9/1985 |
| JP | H10103064 A | 4/1998 |
| WO | 2014064083 A1 | 5/2014 |

* cited by examiner

AIR INLET MANAGEMENT SYSTEM FOR THE FRONT PANEL OF A MOTOR VEHICLE AND STRUCTURE OF SUCH A SYSTEM

The invention relates to a structure of an air inlet air management system for the front panel of a motor vehicle, together with an air inlet air management system for the front panel of a motor vehicle comprising such a structure.

The invention also relates to a method for cooling a heat exchanger of a motor vehicle, implemented by such a system.

Such a system generally comprises at least one flap and one device for controlling the movement of said at least one flap between a closed position of the air inlet and at least one open position of the air inlet.

Such a system is usually denoted by the acronym AGS, from the expression "Active Grille Shutter".

The air inlet management system is preferably installed on a grille of the motor vehicle.

In the open position of the air inlet, the air can flow through the grille to pass through a radiator, contributing in particular to the cooling of the motor vehicle.

In the closed position of the air inlet, the air does not enter via the grille, which reduces drag and thus makes it possible to reduce the energy consumption of the vehicle.

The air inlet management system therefore makes it possible to reduce the energy consumption when the vehicle does not need to be cooled by external air.

In certain vehicle configurations, the radiator is arranged perpendicular to the direction of the air flow generated by the forward motion of the vehicle, i.e. approximately vertically.

In other vehicle configurations, often due to a lack of available space, the heat exchanger cannot physically be positioned perpendicular to the direction of the air flow, which means that it must be inclined relative to the vertical.

The air management system then comprises a structure defining a mechanical frame for the radiator, together with a mouth defining said air inlet, this mouth being in an offset position relative to said frame. This structure channels the air flow from the mouth to said frame, over the entire surface thereof, and in a duct direction that is not perpendicular to the exchange surface of the member to be cooled.

This duct direction, which is slanting relative to the exchange surface, is at the origin of an uneven distribution of the air flow along the length of the radiator. The use of the flaps themselves in their open position is thus known for ensuring improved distribution of the flow over this exchange surface; these flaps direct the air flow in a preferred orientation, for example, a lower flap oriented at 90° and an upper flap oriented at 75° (relative to the vertical).

In order to optimize this distribution, a person skilled in the art would intentionally choose flaps with an effective area with a large dimension widthwise, i.e. along the direction of the flap perpendicular to the pivot axis thereof; these are feathered flaps that are characterized by a pivot axis that is not centered on the width of the effective area.

According to the inventors' observations, the use of such (feathered) flaps provides improved guidance of the air flow and thus permits improved distribution of the air flow over the exchange surface of the radiator in comparison to butterfly flaps (which are characterized by a pivot axis centered on the width of the effective area of the flap). However, this use requires the use of actuators having high operating torques, particularly in order to hold the flaps in position, in particular when the effective area thereof is subject to the pressures exerted by the air flow.

The object of the invention is to overcome all or some of these drawbacks.

The invention relates firstly to a structure of an air inlet air management system for the front panel of a motor vehicle, said structure comprising:
  a frame intended to be positioned facing a heat exchanger,
  one or more deflectors, which can be fixed to said frame, we rigidly connected to said frame and are arranged so as to intercept an air flow and divert it through said frame.

According to optional features of the invention, taken individually or in combination:
  the structure has several deflectors distributed along said frame and spaced apart from each other along the direction of the duct;
  the spacing between two consecutive deflectors increases the further away from said air inlet they are;
  the or each deflector has a curved cross section so as to intercept and adjust the air flow directed through said frame.

According to one embodiment, said structure can comprise:
  a first element defining said frame,
  a second, removable, element forming a cowling covering said frame, said duct being at least partially defined by the inter-space formed the first element and the second element,
  means of assembly between the first element and the second element,
  and wherein said deflector or deflectors are elements integral with the body of the first element.

The first element can be a molded part, said deflector or deflectors being obtained during the molding of the part.

The invention also relates to an air inlet air management system for the front panel of a motor vehicle, comprising a structure according to the invention, and a mouth defining said air inlet, and wherein said air management system has at least one flap, arranged at the mouth, which, in at least one open position, is arranged so as to direct the incoming air flow towards said frame, and wherein said deflector or deflectors, which can be fixed, are arranged so that, in said open position of the at least one flap, said deflector or deflectors intercept the air flow directed by said at least one flap and divert it through said frame.

Thus, advantageously, the air flow is distributed by the combined actions of said at least one flap, at said air inlet, and the deflector or deflectors, near the effective area.

It is then possible to use flaps the effective area of which is smaller than those used in the prior art, and less powerful actuators to control them.

According to one embodiment, said deflector or deflectors are each in the form of a fin projecting from said frame heightwise in the internal space of the duct, and extending longitudinally along the direction of the longitudinal axis of said at least one flap.

According to one embodiment, said at least one flap is a flap mounted pivoting on a support of the structure, and wherein the hinge axis of the flap is centered on the width of the effective area of said at least one flap.

According to one embodiment, said system has several flaps, which at least in their open position are arranged so as to direct the incoming air flow towards said frame.

The invention also relates to a method for cooling a heat exchanger of a motor vehicle, such as a radiator implemented by an air management system according to the invention and wherein said at least one flap is oriented, in said at least one open position, so as to direct the incoming flow towards the deflector or deflectors and evenly distribute the flow over the different zones of the frame that we delimited by said deflector or deflectors.

Further features and advantages of the invention will become apparent on reading the following description. This is purely illustrative and must be read with reference to the attached drawings, in which:

FIG. 1 is a diagrammatic cross-sectional view of an air inlet air management system for the front panel of a motor vehicle, typically used when the radiator is inclined relative to the vertical, the system comprising a frame facing the radiator, an offset mouth, and two feathered flaps, one lower, the other upper, guiding, in their open position, the incoming air flow towards the frame.

FIG. 2 is a diagrammatic cross-sectional view of an air inlet air management system for the front panel of a motor vehicle, according to the invention according to one embodiment, used when the radiator is inclined relative to the vertical, the system comprising a frame facing the radiator, an offset mouth, and two butterfly flaps, one lower, the other upper, guiding, in their open position, the incoming air flow towards the frame, deflectors distributed along the frame contributing with the flaps to an improved distribution of the air flow through the radiator.

PRIOR ART

The prior art illustrated in FIG. 1 will first be described. This is an air inlet air management system 1' for the front panel of a motor vehicle, used when the heat exchanger Ra', typically a radiator, cannot physically be positioned perpendicular to the direction of the air flow F' generated by the forward motion of the vehicle.

Figure 1:
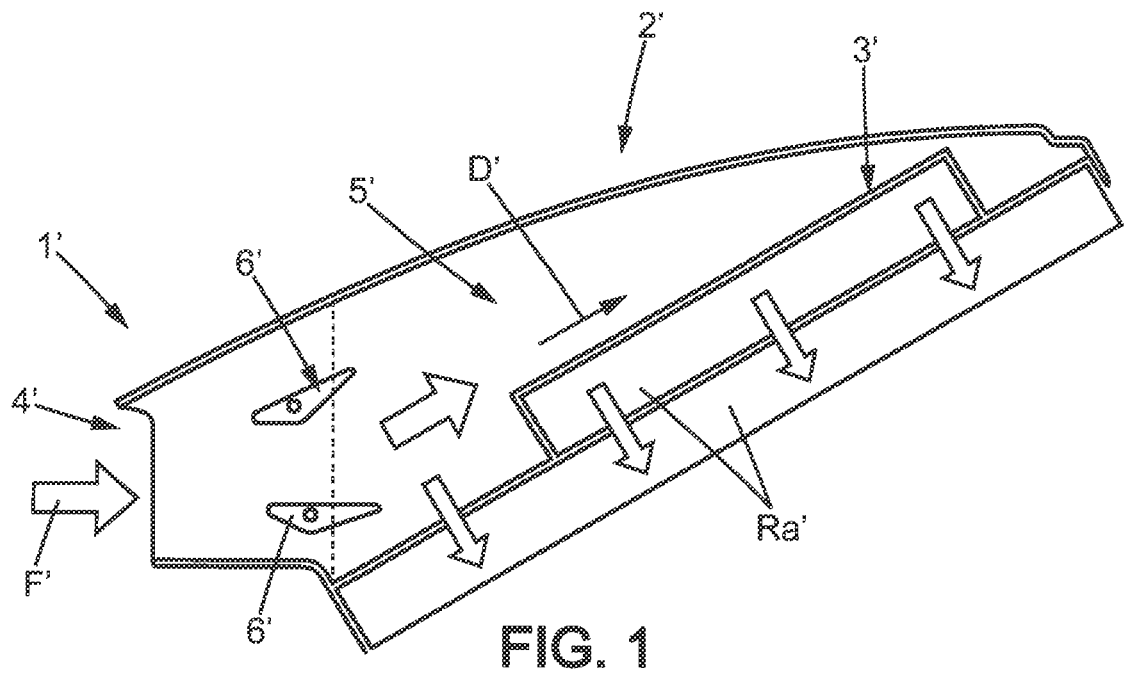

As illustrated in FIG. 1, the radiator is positioned inclined relative to the vertical, and therefore not perpendicular to the air flow F'. The air management system 1' comprises a structure 2' having a frame 3' positioned facing the radiator, together with a mouth 4' defining said air inlet. This structure comprises a duct connecting said mouth 4' to said frame 3'.

As illustrated, the direction D' of this duct is approximately non-perpendicular to the surface of the member to be cooled Ra. The duct 5 guides the air flow from the mouth 4' to said frame 3', to then pass through the member to be cooled Ra.

Two flaps 6' are each pivotably hinged at the mouth. In the closed position, these flaps 6' make it possible to reduce the drag of the vehicle and thus its energy consumption.

The use of the flaps in their open position is thus known for ensuring improved distribution of the flow over the exchange surface of the member to be cooled; these flaps 6 direct the air flow in a preferred orientation, for example, a lower flap oriented at 90° and an upper flap oriented at 75° (relative to the vertical), and as illustrated in FIG. 1.

In order to optimize this distribution, a person skilled in the art would intentionally choose flaps with a large dimension widthwise, i.e. along the direction of the flap perpendicular to the pivot axis thereof; these are feathered flaps that are characterized by a pivot axis that is not centered on the width of the effective area of the flap, and as illustrated in FIG. 1.

According to the inventors' observations, the use of such feathered flaps provides improved orientation of the air flow at the inlet and therefore improved distribution of the air flow over the exchange surface of the member to be cooled, and in comparison to butterfly flaps (which are characterized by a pivot axis centered on the width of the effective area of the flap). However, this use requires the use of actuators having high operating torques, particularly in order to hold the flaps in position, in particular when they are subject to the pressures exerted by the air flow.

Air Inlet Air Management System

The air inlet air management system 1 for the front panel of a motor vehicle, according to the invention, is typically used when the heat exchanger Ra', typically a radiator, cannot physically be positioned perpendicular to the direction of the air flow F generated by the forward motion of the vehicle.

Figure 2:
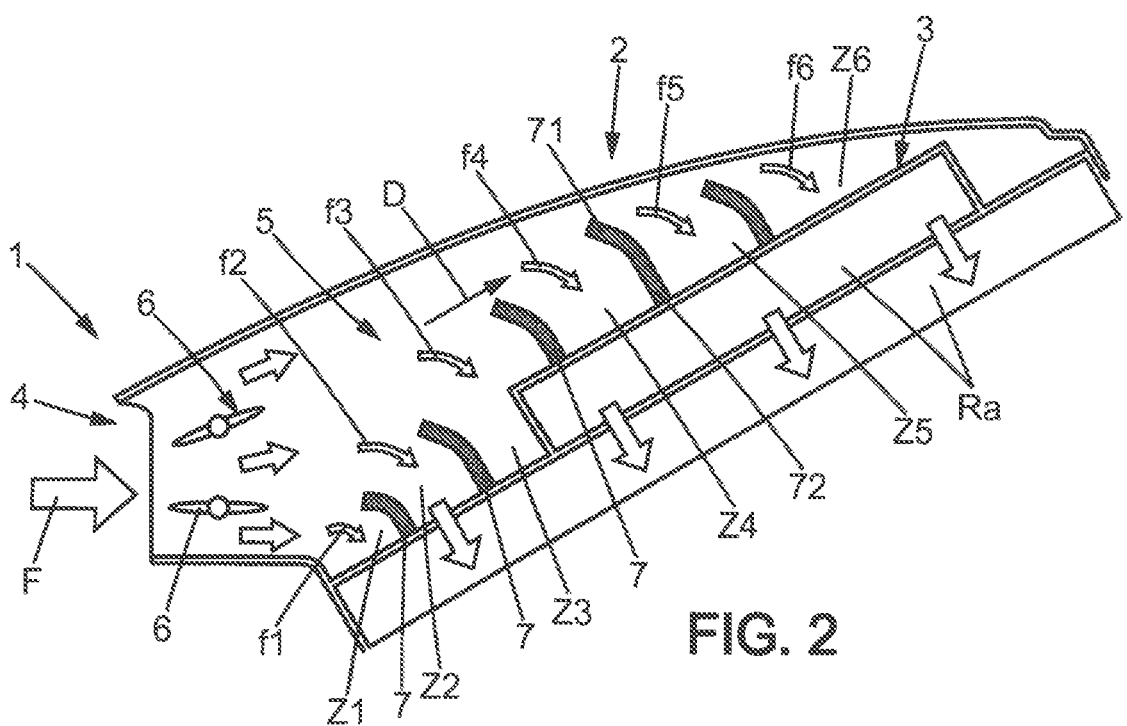

As illustrated in FIG. 2, the radiator is thus positioned inclined relative to the vertical, and therefore not perpendicular to the air flow F.

The system 1 comprises a structure 2 having a frame 3 positioned facing a heat exchanger Ra, such as a radiator, together with a mouth 4 defining said air inlet in an offset position relative to the frame 3. A duct 5 of the structure 2 connects the mouth to said frame 3. This duct 5 guides the air flow from said mouth 4 to said frame 3.

As illustrated by way of non-limitative example in FIG. 2, the direction D of this duct 5 is approximately non-perpendicular to the surface of the member to be cooled, namely the heat exchanger Ra. This duct 5 guides the air flow from the mouth 4 to said frame 3, to then pass through the heat exchanger Ra.

Said air management system has at least one flap 6, arranged at the mouth 4. In the closed position (not shown), said at least one flap 6 makes it possible to reduce the drag of the motor vehicle and therefore its consumption.

Said at least one flap 6, in at least one open position, is arranged so as to direct the incoming air flow towards said frame 3.

It will further be noted that the structure 2 of the air management system has one or more fixed deflectors 7 inside the duct 5. This or these deflectors 7 are arranged near said frame 3.

As illustrated in FIG. 2, in said open position of the at least one flap 6, the deflector or deflectors 7 intercept the air flow directed by said at least one flap 6 and divert it through said frame 3 to cool the member Ra.

In other words, advantageously, the air flow at the frame 3 is distributed by the combined guiding actions of said at least one flap 6, at the mouth 4, and the deflector or deflectors 7, near the frame 3.

The system can have several superposed flaps 6 which, in at least their open position, are arranged so as to direct the incoming air flow towards said mechanical frame 3.

As illustrated in FIG. 2, it becomes possible to use, for said at least one flap, a butterfly flap, which is characterized by a hinge axis of the flap centered on the width of the effective area of said at least one flap 6.

The use of such butterfly flaps is advantageous in that they require much less torque than is necessary to hold a feathered flap in position.

By way of example, the torque necessary to control the feathered flaps 6' of the system 1' according to the prior art is estimated at 4 Nm. When the feathered flaps 6' are replaced by a butterfly flap 6/deflector 7 assembly of a system according to the invention, the torque necessary to control the flaps 6 is estimated at just 1.2 Nm.

The invention advantageously makes it possible to use a less powerful actuator to control the flaps, without any reduction in cooling performance.

Deflectors

According to one embodiment, the system 1 has several deflectors 7 distributed on said frame 3 and spaced apart from each other along the direction D of the duct.

The spacing between two consecutive deflectors 7 can increase the further away they are from said air inlet. Thus, by way of example in FIG. 4, the distance X between the first deflector and the second deflector is shorter than the distance Y between the second deflector and the third deflector, which in turn is shorter than the distance Z between the third deflector and the fourth deflector.

Said deflector or deflectors 7 can each be in the form of a fin projecting, from said frame 3, heightwise in the internal space of the duct 5. This fin extends longitudinally along the direction of the longitudinal axis of said at least one flap 6, particularly over the entire dimension of the frame in this direction.

The or each deflector 7 can have a curved cross section. Such a cross section makes it possible to intercept and adjust the air flow through said frame 3. Such a curved cross section is illustrated by way of non-limitative example in FIGS. 2 to 4. It will be noted that the distal end 71 of the curved cross section of the deflector 7 is inclined towards the mouth 4, whereas the proximal end 72 of the curved cross section is approximately perpendicular to the exchange surface of the member Ra to be cooled. The cross section of the deflector extends along a curve between its two ends 71, 72.

The structure 2 of the system can comprise a first element 20 defining said frame 3, a second removable element 21, at least partially forming the walls of the duct 5 covering said frame 3, and even a third element 22, comprising a support on which the flap or flaps 6 are hinged. Assembly means make it possible to assemble these various elements 20 to 22.

Figure 4:
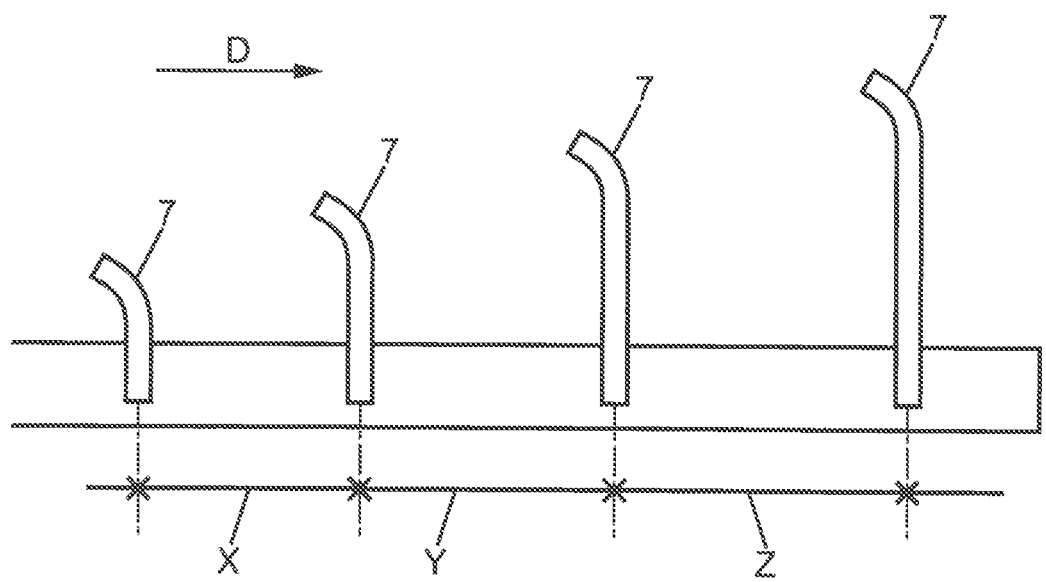
FIG. 4 is a detailed view illustrating, by way of example, a possible dimensional arrangement of the different deflectors.

As illustrated in FIG. 4, it will be noted that the second element 21 forms a cowling covering the frame 3 of the first element 20. The duct 5 is then at least partially defined by the inter-space formed between these two elements 20 and 21. The third element 22 is assembled to this assembly to form the mouth 4 of the structure 2.

It will further be noted that said deflector or deflectors 7 can be elements integral with the body of the first element 20. Said first element 20 can be a molded part, typically plastic, said deflector or deflectors 7 being obtained during the molding of the plastic part.

Cooling Method

The invention also relates to a method for cooling a heat exchanger Ra of a motor vehicle, such as a radiator implemented by an air inlet management system 1 according to the invention.

According to the method, said at least one flap 6 is oriented, in said at least one open position, so as to direct the incoming flow towards the deflectors 7 and distribute the incoming flow evenly over the different zones Z1 to Z6 of the frame delimited by said deflector or deflectors 7.

Such a method is illustrated in FIG. 2. It will be noted that the air flow F generated by the forward motion of the vehicle is distributed by the action of two superposed flaps 6 at the air inlet. In this example illustrated, there are five fixed deflectors 7 along the direction D of the duct 5. These deflectors 7 define six separate zones Z1 to Z6 of the frame 3. The orientations of the flaps 6 distribute the air flow into six flow streams f1 to f6 that respectively feed the six zones Z1 to Z6. The flaps are oriented in preferred directions, which can be different, and so as to ensure even cooling of the member to be cooled Ra over the entire exchange surface of the member to be cooled.

Advantages

As already stated, the management system according to the present invention, as well as the cooling method, makes it possible to obtain even cooling of the radiator, advantageously without requiring the use of large flaps, particularly feathered flaps, the control of which requires significant actuating torque. The invention advantageously makes it possible to use a less powerful and less costly actuator to control the flap or flaps than the prior art.

NOMENCLATURE

Figure 3:
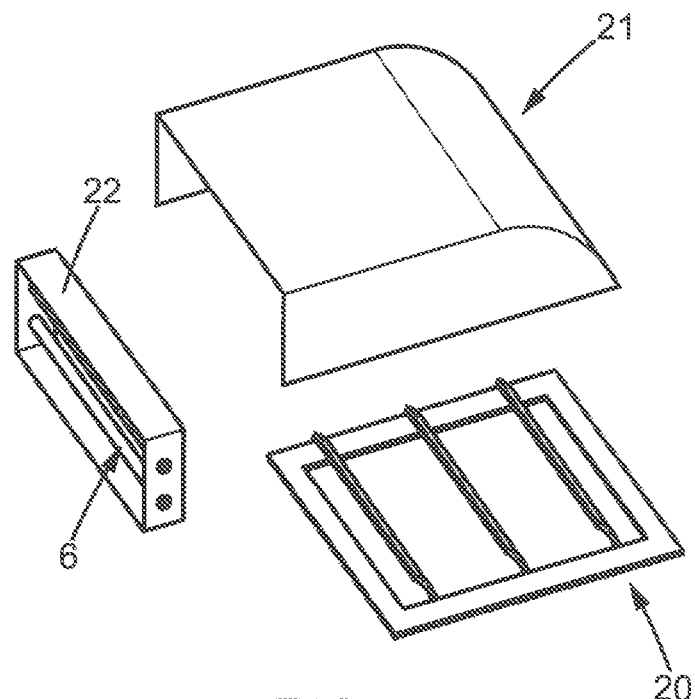
FIG. 3 is an exploded view diagrammatically illustrating three structural elements of a system according to one embodiment, including a first element defining the frame with the radiator, a second element intended to cover said frame to form the duct, and a third element forming the mouth and a support on which the flap or flaps are hinged.

Invention (FIGS. 2 to 4)

1. Air management system,
2. Structure,
20. First element (structure),
21. Second element (structure),
22. Third element (structure),
3. Frame,
4. Mouth (Air inlet),
5. Duct,
6. Flap,
7. Deflectors,
D. Direction of the duct,
F. Air flow generated by the forward motion of the vehicle,
Ra. Heat exchanger,
Z1 to Z6. Zones of the frame delimited by the deflectors 7,
f1 to f6. Air flow streams.

Prior Art (FIG. 1)

1'. Air management system,
2'. Structure,
3'. Frame,
4'. Mouth,
5'. Duct,
6'. Flap,
D'. Direction of the duct,
F'. Air flow generated by the forward motion of the vehicle,
Ra'. Heat exchanger.

The invention claimed is:

1. A structure of an air inlet air management system for the front panel of a motor vehicle wherein said air inlet air management system comprises: a mouth defining the air inlet and at least one flap, arranged at the mouth, which in at least one open position, is arranged to direct the incoming air flow towards a frame, and wherein one or more deflectors are arranged so that, in said open position of the at least one flap, said one or more deflectors intercept an air flow directed by said at least one flap and divert air flow through said frame, said structure comprising:
  the frame positioned in facing contact with a heat exchanger; and
  the one or more deflectors, which are rigidly connected to said frame and are arranged so as to intercept the air flow and divert the air flow through said frame,
  wherein said one or more deflectors are each in the form of a fin projecting from said frame heightwise in the internal space of the duct, and extending longitudinally along the direction of the longitudinal axis of said at least one flap.

2. The structure as claimed in claim 1, having several deflectors distributed along said frame and spaced apart from each other along the direction of the duct.

3. The structure as claimed in claim 2, wherein the spacing between two consecutive deflectors increases the further away from said air inlet the consecutive deflectors are.

4. The structure as claimed in claim 1, further comprising:
a first element defining said frame,
a second, removable, element forming a cowling covering said frame, a duct being at least partially defined by the inter-space formed the first element and the second element,
means of assembly between the first element and the second element,
and wherein said deflector or deflectors are elements integral with the body of the first element.

5. The structure as claimed in claim 4, wherein said first element is a molded part, said deflector or deflectors being obtained during the molding of the part.

6. The structure as claimed in claim 1, wherein each deflector has a curved cross section so as to intercept and adjust the air flow directed through said frame.

7. An air inlet air management system for a front panel of a motor vehicle, the system comprising:
a structure comprising:
a frame positioned in facing contact with a heat exchanger; and
one or more deflectors, which are rigidly connected to said frame and are arranged so as to intercept an air flow and divert the air flow through said frame; and
a mouth defining said air inlet,
wherein said air management system has at least one flap, arranged at the mouth, which, in at least one open position, is arranged so as to direct the incoming air flow towards said frame,
wherein said deflector or deflectors are arranged so that, in said open position of the at least one flap, said deflector or deflectors intercept the air flow directed by said at least one flap and divert air flow through said frame, and
wherein said deflector or deflectors are each in the form of a fin projecting from said frame heightwise in the internal space of the duct, and extending longitudinally along the direction of the longitudinal axis of said at least one flap.

8. The system as claimed in claim 7, wherein said at least one flap is a flap mounted pivoting on a support of the structure, and wherein the hinge axis of the flap is centered on the width of the effective area of said at least one flap.

9. The system as claimed in claim 7, having several flaps, which at least in their open position are arranged so as to direct the incoming air flow towards said frame.

10. A method for cooling a heat exchanger of an air inlet air management system for a front panel of a motor vehicle, the air inlet air management system comprising:
a structure comprising:
a frame positioned in facing contact with a heat exchanger; and
one or more deflectors, which are rigidly connected to said frame and are arranged so as to intercept an air flow and divert the air flow through said frame; and
a mouth defining said air inlet,
at least one flap, arranged at the mouth, which, in at least one open position, is arranged to direct the incoming air flow towards said frame, and
wherein said deflector or deflectors are arranged so that, in said open position of the at least one flap, said deflector or deflectors intercept the air flow directed by said at least one flap and divert air flow through said frame,
the method comprising:
orienting said at least one flap, in said at least one open position, so as to direct the incoming flow towards the deflector or deflectors and evenly distribute the flow over the different zones of the frame that are delimited by said deflector or deflectors.

* * * * *